Figure 1:
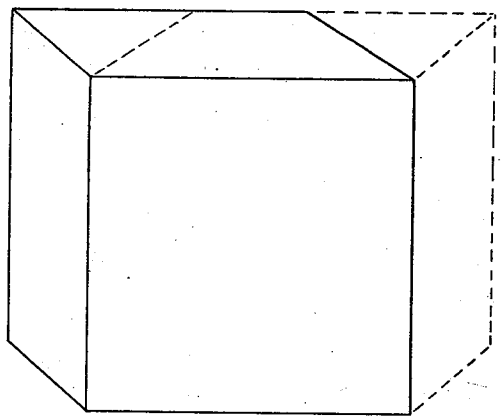

(No Model.)

L. D. DUHAURON.
STEREOSCOPIC PRINT.

No. 544,666.          Patented Aug. 20, 1895.

Witnesses:
J. M. Fowler Jr.
Thomas Durant

Inventor
Louis D. Duhauron
by Church & Church
his Attorneys.

UNITED STATES PATENT OFFICE.

LOUIS DUCOS DUHAURON, OF ALGIERS, ALGERIA, ASSIGNOR TO EUGÉNE DEMOLE, OF GENEVA, SWITZERLAND.

STEREOSCOPIC PRINT.

SPECIFICATION forming part of Letters Patent No. 544,666, dated August 20, 1895.

Application filed September 19, 1894. Serial No. 523,502. (No model.) Patented in France September 15, 1891, No. 216,465, and in Belgium July 3, 1894, No. 110,803.

*To all whom it may concern:*

Be it known that I, LOUIS DUCOS DUHAURON, a citizen of the Republic of France, residing at Algiers, Algeria, have invented certain new and useful Improvements in or Relating to Stereoscopic Prints, (for which I have obtained patents in France, No. 216,465, dated September 15, 1891, and in Belgium, No. 110,803, dated July 3, 1894,) of which the following is a specification.

Mr. D'Almeida, a French physician, and, after him, Mr. Molteni, have obtained in a very elegant way the production of double images arranged for binocular vision and united in a single picture when properly viewed.

This process as at last developed by Molteni consists in taking two transparent stereoscopic images and placing each of them in a separate magic lantern and projecting them so that they overlay the one the other upon the screen. The perspective not being exactly the same in each, the single picture resulting from this superimposition has to each individual spectator the appearance to the naked eye of a confused image; but if, on the one hand, the picture corresponding in perspective to a view with the right eye is illuminated in green by means of a glass of that color interposed in the lantern, and that corresponding perspective to a view with the left eye is illuminated in red by a red glass; and if, on the other hand, each spectator uses a double eyeglass of special make having a piece of flat green glass for its right-hand lens and a piece of flat red glass on the left-hand side the result will be that each eye will see (in the combined picture) only that of which the perspective is suited to it, the chaos of lines disappears, and the perfect picture is thrown into relief as distinctly as in the best stereoscope.

The process which is the subject of the present invention realizes this phenomenon not merely at night and by the artificial light of a lantern, in the form of an immaterial image projected on a screen, but in full daylight and in the form of a print or photograph, a palpable object, which can be taken in the hand or laid upon a desk, for inspection, or hung against a wall like a picture. The effect will be so much the more striking, inasmuch as there is nothing of the appearance of a show, phantasmagoria, or entertainment of any kind about it—*i. e.*, neither darkness, screen, nor magic lantern. The only objects visible are plainly those which belong to the ordinary every-day world, a lithograph, a drawing, or a print lying on a table.

Of all the objects used by D'Almeida I preserve only the pair of spectacles of plain but differently-colored glasses.

Figure 2:
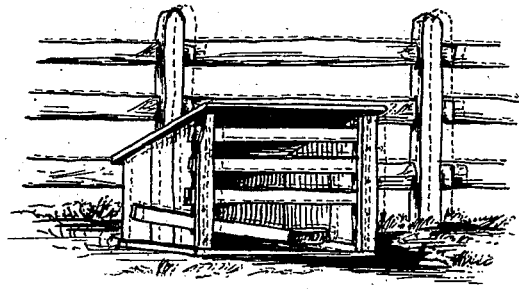

Figure 1 represents an object, a cube in this instance, seen alternately by the left and right eye, the full lines corresponding to the perspective view of the left eye and the dotted lines to the perspective view of the right eye. Fig. 2 is a view illustrating two superimposed pictures, the dotted lines corresponding to the perspective view of one eye and the full lines corresponding to the perspective view of the other eye.

The procedure is as follows: With or without the aid of photography, two drawings are prepared upon a white ground—such as, *e. g.*, a piece of paper—and may either be drawn by hand, lithographed, or printed, &c. Of these two representations of one and the same object, the one corresponds to the perspective view of the right eye, the other to that of the left eye. One of the two drawings is laid upon the other, care being taken to fix the line of the horizon (or point of view) at the same height in both pictures. As regards perfect coincidence, that must be completely given up—*i. e.*, for simultaneous production in every plane—owing to stereoscopism (or double vision). In lieu of forming the shadows of these two pictures in black, blackish, or dark-gray tints, as if the matter in hand related only to the projection of two separate stereoscopic pictures, illuminated artificially by a magic lantern, the one by a green and the other by a red light, respectively, and thrown on a screen, the two drawings are prepared from the outset and directly by two differently-colored pencils, or in two different inks or colors, which must translate the shades or render them to the total exclusion of all black tints. Each of the two colors used must be that which the colored glass of the corresponding side of the spectacles allows to pass freely, but is totally intercepted by the colored glass of the other side of the spectacles, so that each eye will only perceive the picture which agrees with it in point of perspective view. Thus by an instinctive ocular action each spectator, looking through the spectacles or eyeglasses in question, will naturally confound the two different pictures in one, double vision being destroyed and single vision restored exactly as with the naked eye in presence of natural objects. The illusion will consequently be complete. If the subject represented and inspected comprises great depth—as in a landscape, a long gallery, and the like—the flat surface (e. g., the sheet of white or light-tinted paper) which carries the print or other drawing will be as if annihilated or non-existent, and the eye will plunge into space, as if looking out of a window.

In practice it is essential that one at least of the two colors, that which forms the second phase of the process, should be of a transparent nature; or if I may so say, in the language of printers, it is essential that it should not "cover." Otherwise the color underneath would not fulfill its part.

To the naked eye the confused picture resulting from the superimposition appears as a whole printed in blackish tones with a medley of bands of the two colors used. By the selective power of the two eyeglasses it is resolved into a relief-picture of one uniform black tint.

In M. D'Almeida's combination each of the two projected images requires to be seen through a spectacle-lens of the same color as the glass in the lantern by which it is projected. In this invention, on the contrary, in order to make the image appear black without color-medley on the colored shades of each image, each glass of the spectacles must by its color intercept the color of the print corresponding to its own color and permit the lines of the other color to pass through, but being blended with the color of the glass gives the impression of a dark-line print. The shade passes through and is visible, the color not.

As regards the colors to be adopted, there is a certain amount of choice. For printing-colors it is preferable to use two complementary colors—i. e., red and green, or orange and blue, or yellow and blue-violet; but for spectacle-glasses a green glass will correspond to a red image, a blue glass to an orange image, and a blue-violet glass to a yellow image, and vice versa, respectively. The two colors to be given to the two images must be as distinct and pronounced of their several kinds as possible, so that when seen through the glass of the same color they may efface each other and merge in the white ground almost, if not quite, completely.

As a general rule, in order that a picture or view may appear of natural size care must be taken in printing one image above the other to arrange a distance between the two reproductions of any one point taken from some distant plane analogous to that between the two eyes or their retinæ—i. e., about seven centimeters. In such case there will be exact coincidence for the selected points of comparison—such as, e. g., the opening of a window, a cask, an arch, &c., serving as a set-off to put all other objects in their proper places. Some such point arranged or selected in the foreground of the picture adds greatly to the strength of the illusion.

It is worthy of remark that even were the two images not accurately stereoscopic in their mutual relation, but simply identical, the distance of seven centimeters, just mentioned, would suffice to produce the effects of distance and enlargement or solidity in themselves curious enough. Further, also, that if by inadvertence or voluntarily the places of the two colored glasses before the eyes be interchanged the picture, instead of retreating, would advance toward the spectator; those parts in relief would become hollow, and vice versa.

Phantasmagoric effects may be obtained by the displacement or sliding of one of the pictures over the other, if care has previously been taken to print the upper picture at least, on a transparent film not adhering to the surface of the lower one.

I claim—

1. As a new article, a stereoscopic print consisting of two images or pictures, one corresponding to the perspective view of the right eye and the other to that of the left eye, superimposed one upon the other in such manner as to have a common point of view.

2. As a new article, a stereoscopic print consisting of two images or pictures in complementary colors, one corresponding to the perspective of the right eye and the other to that of the left eye, superimposed one upon the other in such manner as to have a common point of view.

3. As a new article, a stereoscopic print, consisting of two images or pictures in complementary colors, one corresponding to the perspective of the right eye and the other to that of the left eye, one or both of said colors being transparent, said pictures being superimposed, one upon the other in such manner as to have a common point of view.

4. A stereoscopic print consisting of two pictures, one of which is carried by a transparent film placed over the other, and movable over the surface of the first.

5. In combination with a stereoscopic print, consisting of two superimposed colored images or pictures, as described, of a pair of lenses or glasses, having each the color of one of the images, whereby one will permit the passage of one image and intercept the other, and conversely; as set forth.

LOUIS DUCOS DUHAURON.

Witnesses:
ACHILLE MARILLIER,
EDOUARD POL.